US007633842B2

United States Patent
He et al.

(10) Patent No.: US 7,633,842 B2
(45) Date of Patent: Dec. 15, 2009

(54) APPARATUS FOR GENERATING TRACKING ERROR SIGNAL IN OPTICAL DISC DRIVE

(75) Inventors: Wei-Hung He, Taipei Hsien (TW); Kuang-Yu Yen, Tai-Chung (TW)

(73) Assignee: Realtek Semiconductor Corp., HsinChu (TW)

( * ) Notice: Subject to any disclaimer, the term of this patent is extended or adjusted under 35 U.S.C. 154(b) by 359 days.

(21) Appl. No.: 11/162,794

(22) Filed: Sep. 23, 2005

(65) Prior Publication Data
US 2006/0007808 A1    Jan. 12, 2006

Related U.S. Application Data

(63) Continuation-in-part of application No. 11/160,820, filed on Jul. 12, 2005.

(30) Foreign Application Priority Data

| Jul. 8, 2004 | (TW) | ............................. 93120463 A |
| Jul. 22, 2004 | (TW) | ............................. 93121904 A |
| Sep. 24, 2004 | (TW) | ............................. 93129140 A |

(51) Int. Cl.
*G11B 7/00* (2006.01)
(52) U.S. Cl. .............. 369/44.35; 369/44.29; 369/44.32; 369/44.34; 369/44.41; 369/53.28; 369/53.35
(58) Field of Classification Search .............. 369/44.34, 369/44.28, 44.41, 44.11, 53.35, 44.32, 53.28, 369/44.29
See application file for complete search history.

(56) References Cited

U.S. PATENT DOCUMENTS

| 4,785,441 | A | | 11/1988 | Tanaka et al. | |
| 5,060,216 | A | * | 10/1991 | Suzuki et al. | ............. 369/44.41 |
| 5,117,408 | A | * | 5/1992 | Weispfenning et al. | .. 360/78.14 |
| 5,666,341 | A | * | 9/1997 | Horibe et al. | ............. 369/47.28 |
| 5,956,304 | A | | 9/1999 | Supino et al. | |
| 6,137,755 | A | * | 10/2000 | Bakx et al. | ................ 369/44.34 |
| 6,236,628 | B1 | | 5/2001 | Kim | |
| 6,266,305 | B1 | | 7/2001 | Buchler | |
| 6,504,799 | B1 | | 1/2003 | Yamashita | |
| 6,741,532 | B1 | | 5/2004 | Graba | |
| 6,741,533 | B1 | | 5/2004 | Hiratsuka | |
| 6,781,932 | B2 | | 8/2004 | Beatson | |

(Continued)

FOREIGN PATENT DOCUMENTS

CN    1321304 A    11/2001

(Continued)

*Primary Examiner*—Wayne R Young
*Assistant Examiner*—Adam R Giesy
(74) *Attorney, Agent, or Firm*—Winston Hsu (57) ABSTRACT

The present invention discloses an apparatus for generating a TE signal in an optical disc drive. The disclosed apparatus includes a signal generation module, a quality detection module coupled to the signal generation module, and a signal-synthesizing module coupled to the signal generation module and the quality detection module. The signal generation module generates a first and a second candidate TE signal according to a light beam reflected off an optical disc. The quality detection module estimates the signal quality of the first and/or the second candidate TE signal and controls the signal-synthesizing module accordingly. The signal-synthesizing module generates the TE signal according to the first and/or the second candidate TE signal.

9 Claims, 5 Drawing Sheets

U.S. PATENT DOCUMENTS

| | | |
|---|---|---|
| 6,937,542 B1 | 8/2005 | Ogawa |
| 6,954,709 B2 * | 10/2005 | Mashimo ............... 702/81 |
| 7,161,877 B2 | 1/2007 | Lai |
| 7,295,498 B2 * | 11/2007 | Nakano et al. ......... 369/44.36 |
| 2003/0046037 A1 | 3/2003 | Mashimo |
| 2003/0107961 A1 * | 6/2003 | Yasuda et al. ......... 369/44.27 |
| 2003/0202438 A1 | 10/2003 | Nomoto |
| 2004/0081040 A1 | 4/2004 | Yamamoto |
| 2004/0151089 A1 | 8/2004 | Buchler |
| 2004/0160250 A1 | 8/2004 | Kim |
| 2004/0196755 A1 | 10/2004 | Cheng |

FOREIGN PATENT DOCUMENTS

| | | |
|---|---|---|
| CN | 1133991 C | 1/2004 |
| TW | 513716 | 12/2002 |

* cited by examiner

| A1 | B1 | A2 | B2 | UPAB | DOWNAB |
|---|---|---|---|---|---|
| 1 | 0 | 0 | 0 | 1 | 0 |
| 0 | 1 | 1 | 1 | 1 | 0 |
| 0 | 1 | 0 | 0 | 0 | 1 |
| 1 | 0 | 1 | 1 | 0 | 1 |
| 0 | 0 | 1 | 0 | 0 | 1 |
| 1 | 1 | 0 | 1 | 0 | 1 |
| 0 | 0 | 0 | 1 | 1 | 0 |
| 1 | 1 | 1 | 0 | 1 | 0 |
| 0 | 0 | 0 | 0 | 0 | 0 |
| 1 | 1 | 0 | 0 | 0 | 0 |
| 1 | 0 | 1 | 0 | 0 | 0 |
| 1 | 0 | 0 | 1 | 0 | 0 |
| 0 | 1 | 1 | 0 | 0 | 0 |
| 0 | 1 | 0 | 1 | 0 | 0 |
| 0 | 0 | 1 | 1 | 0 | 0 |
| 0 | 0 | 0 | 0 | 0 | 0 |

APPARATUS FOR GENERATING TRACKING ERROR SIGNAL IN OPTICAL DISC DRIVE

CROSS REFERENCE TO RELATED APPLICATIONS

This is a continuation-in-part of U.S. patent application Ser. No. 11/160,820, entitled "APPARATUS AND METHOD FOR GENERATING A TRACKING ERROR SIGNAL IN AN OPTICAL DISC DRIVE", filed Jul. 12, 2005, which is a continuation-in-part of U.S. patent application Ser. No. 11/160,692, entitled "APPARATUS AND METHOD FOR GENERATING A TRACKING ERROR SIGNAL IN AN OPTICAL DISC DRIVE", filed Jul. 6, 2005, both of which are incorporated herein in their entirety by reference.

BACKGROUND OF THE INVENTION

1. Field of the Invention

The present invention relates to optical disc drives, and more particularly, to tracking error signal generated in optical disc drives.

2. Description of the Prior Art

An Optical sensor on a pick-up head (PUH) of an optical disc drive can be divided into four parts A, B, C, and D. When an optical disc is being read or written, the above-mentioned four parts A, B, C, and D detect light beams reflected from the optical disc to generate corresponding signals A, B, C, and D, and utilize phase information generated when the PUH deviates from an optical disc track to obtain a tracking error signal TE, which is supplied to a servo controller. A typical phase detection method utilizes a phase comparator to determine a phase difference between the signals A and B, utilizes another phase comparator to determine a phase difference between the signals C and D, and then synthesizes the two signals representing phase difference to generate the required tracking error signal. However, the phase difference between the signals A and B and the phase difference between the signals C and D do not contain tracking error information of equal significance at every instance. When one is more significant than the other, a tracking error signal generated by simply adding the two may not be the best representation of the tracking error information.

SUMMARY OF THE INVENTION

One objective of the claimed invention is therefore to provide an apparatus for generating a tracking error signal to adaptively alter the signal generating strategy.

According to an exemplary embodiment of the claimed invention, an apparatus is disclosed for generating a tracking error signal in an optical disc drive. The apparatus comprises: a signal generation module for generating a first and a second candidate tracking error signal according to a light beam reflected off an optical disc; a quality detection module coupled to the signal generation module for detecting quality of the first and/or the second candidate tracking error signal; and a signal-synthesizing module coupled to the signal generation module and the quality detection module, wherein the signal-synthesizing module is controlled by the quality detection module for selectively generating a tracking error signal according to the first and/or the second candidate tracking error signal.

According to another exemplary embodiment of the claimed invention, an apparatus is disclosed for generating a tracking error signal in an optical disc drive. The apparatus comprises: a signal generation module for generating a first and a second candidate tracking error signal according to a light beam reflected off an optical disc; a quality detection module coupled to the signal generation module for detecting a representing level of the first and/or the second candidate tracking error signal; and a signal-synthesizing module coupled to the signal generation module and the quality detection module. Basing on the detection result of the quality detection module, the signal-synthesizing module generates a tracking error signal selectively according to the first and/or the second candidate tracking error signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
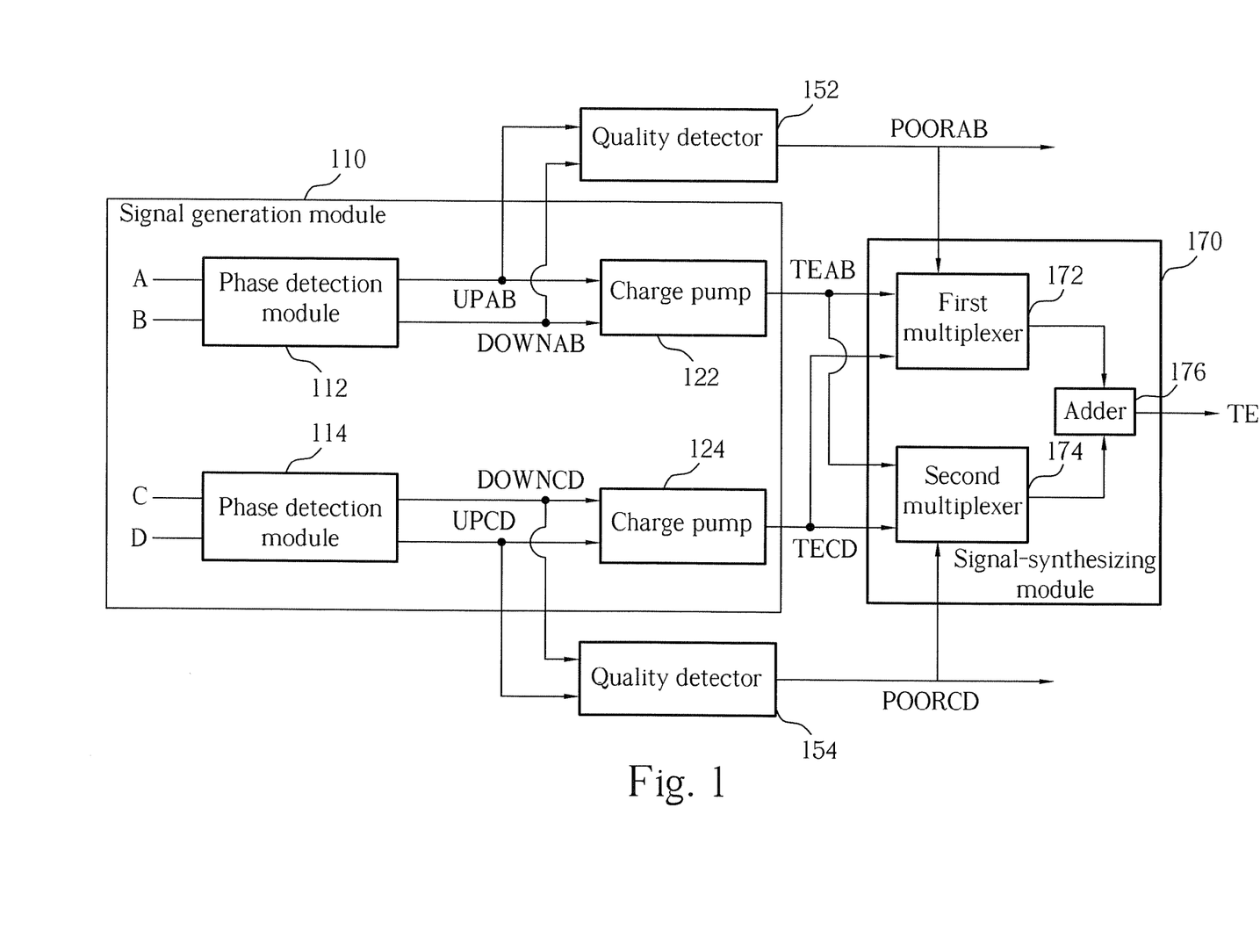
FIG. 1 is a diagram of a tracking error signal generating apparatus according to an embodiment of the present invention.

Please refer to FIG. 1. FIG. 1 shows a diagram of a tracking error signal generating apparatus according to an embodiment of the present invention. The inventive apparatus can be applied to an optical disc drive for generating a tracking error signal TE. The apparatus of this embodiment comprises a signal generation module 110, a quality detection module, which is comprised of a first quality detector 152 and a second quality detector 154, and a signal-synthesizing module 170. The signal generation module 110 generates a first candidate tracking error signal TEAB and a second candidate tracking error signal TECD according to a light beam reflected off an optical disc. The quality detectors 152 and 154 respectively detect quality of the candidate tracking error signals TEAB and TECD to generate a first indication signal POORAB and a second indication signal POORCD. In this embodiment, the quality detector 152 triggers the indication signal POORAB when inferior quality in the signal TEAB is detected, and the quality detector 154 triggers the indication signal POORCD when inferior quality in the signal TECD is detected. The signal-synthesizing module 170 is controlled by the indication signals POORAB and POORCD for selectively generating the resulting tracking error signal TE according to the candidate tracking error signals TEAB and TECD.

The signal generation module 110 of the present embodiment comprises an optical sensing module (not shown), a first phase detection module 112, a first charge pump 122, a second phase detection module 114, and a second charge pump 124. The optical sensing module is utilized to sense the above-mentioned light beam reflected off an optical disc to generate a first, second, third, and fourth analog signal A, B, C, and D, respectively. As known to those skilled in the art of optical disc drives, the four analog signals A, B, C, and D can first be processed by AC coupling capacitors, equalizers, and low pass filters (LPF), and then inputted into the phase detection modules 112 and 114.

Figure 2:
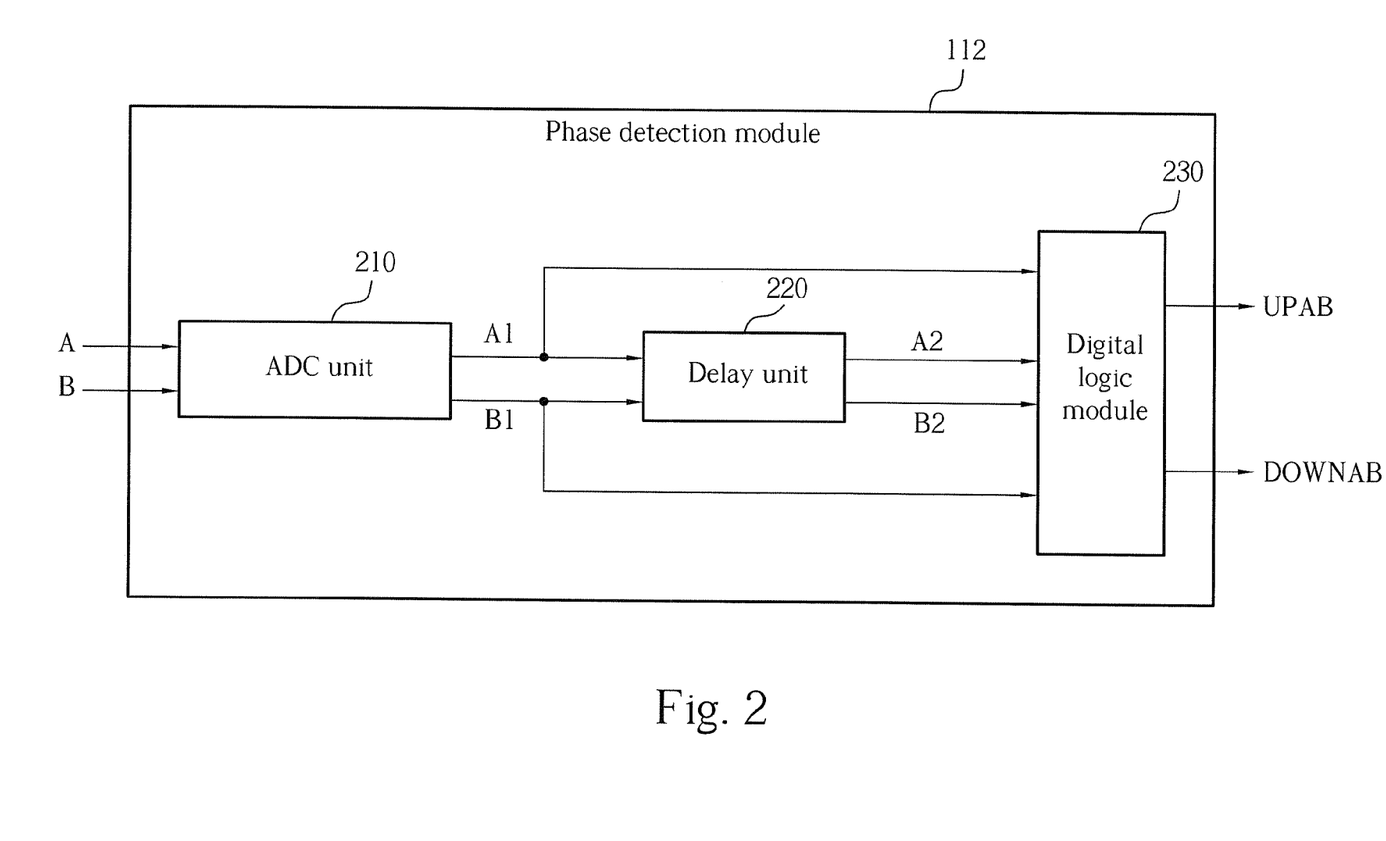
FIG. 2 is a detailed diagram illustrating the operation of the phase detection module shown in FIG. 1.
Figure 3:
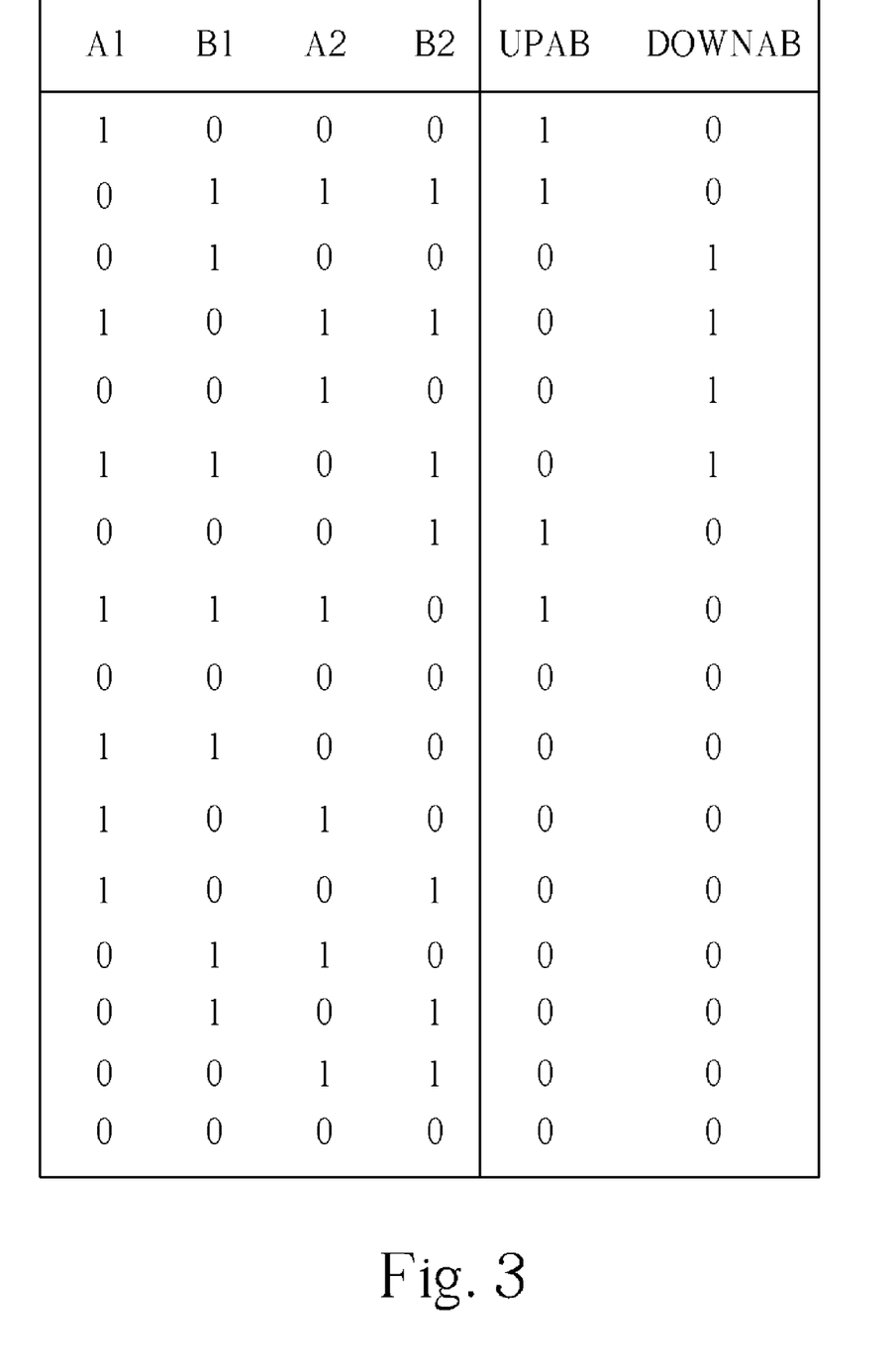
FIG. 3 is an exemplary truth table illustrating the operation of the digital logic module shown in FIG. 2.

FIG. 2 shows a detailed diagram illustrating the operation of the phase detection module 112 shown in FIG. 1. The phase detection module 112 comprises an analog-to-digital (ADC) unit 210, a delay unit 220, and a digital logic module 230. The ADC unit 210 converts the analog signals A and B into a digital signal A1 and a digital signal B1, respectively, with a sampling rate of 1/Ts. The digital signals A1 and B1 of the present embodiment are both 1-bit digital signals. The delay unit 220 delays the first and second digital signals A1 and B1 to generate a delay signal A2 and a delay signal B2, respectively. A preferred manner is to delay the digital signal A1 by 2 Ts to generate the delay signal A2, and to delay the digital signal B1 by 2 Ts to generate the delay signal B2. The digital logic module 230 generates a control signal UPAB and a control signal DOWNAB according to the signals A1, B1, A2, and B2. FIG. 3 shows an exemplary truth table illustrating the operation of the digital logic module 230 shown in FIG. 2. When a value of the signal A1 differs from values of the signals B1, A2, and B2, or a value of the signal B2 differs from values of the signals A1, B1, and A2, the digital logic module 230 determines that a phase of the analog signal A precedes a phase of the analog signal B. At this moment a control signal UPAB is triggered to increase a level of the candidate tracking error signal TEAB through the charge pump 122 shown in FIG. 1. Similarly, when the value of the signal A2 differs from values of the signals A1, B1, and B2, or the value of the signal B1 differs from values of the signals A1, A2, and B2, the digital logic module 230 determines that the phase of the analog signal B precedes the phase of the analog signal A. At this moment a control signal DOWNAB is triggered to decrease the level of the candidate tracking error signal TEAB through the charge pump 122 shown in FIG. 1.

The phase detection module 114 of FIG. 1 has the same architecture as the phase detection module 112 of FIG. 2. More specifically, the phase detection module 114 generates the control signals UPCD and DOWNCD according to the analog signals C and D. In other words, the phase detection module 114 detects a phase difference between the analog signals C and D and triggers the control signal UPCD or DOWNCD accordingly. The control signal UPCD or DOWNCD is then utilized to increase or decrease the level of the candidate tracking error signal TECD through the charge pump 124 shown in FIG. 1, However, the phase detection modules 112 and 114 can also be implemented by different architectures and are not meant to be taken as a limitation.

When the analog signal A precedes the analog signal B, the larger the phase difference exists between the two signals, the higher the probability the digital logic module 230 will trigger the control signal UPAB. At this moment the charge pump 122 increases the level of the candidate tracking error signal TEAB. Similarly, when the analog signal B precedes the analog signal A, the larger the phase difference exists between the two signals, the higher the probability the digital logic module 230 will trigger the control signal DOWNAB. At this moment the charge pump 122 decreases the level of the candidate tracking error signal TEAB. Normally within a given period of time, the control signals UPAB and DOWNAB do not at the same time experience numerous triggered sample points. For most of the time, one of the signals has more triggered sample points than the other. If the two signals both have many triggered sample points, this means that quality of the candidate tracking error signal TEAB generated from the charge pump 122 is poor. In other words, the candidate tracking error signal TEAB does not fully reflect the actual tracking error phenomenon and is therefore not suitable for representing tracking error. In this case the quality detector 152 of the present embodiment generates the first indication signal POORAB according to the control signals UPAB and DOWNAB, and the quality detector 154 generates the second indication signal POORCD according to the control signals UPCD and DOWNCD.

Figure 4:
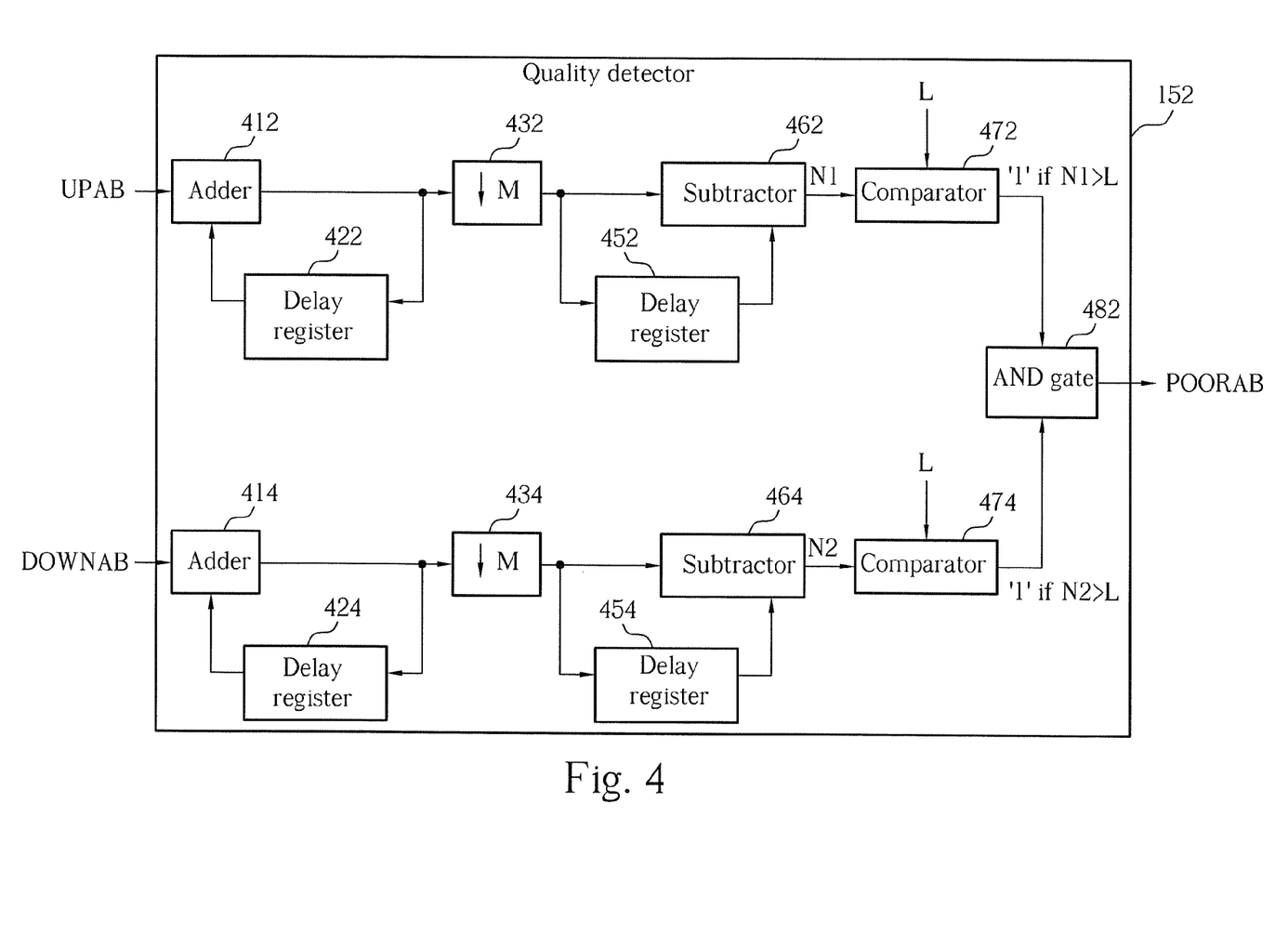
FIG. 4 is a detailed diagram of the quality detector shown in FIG. 1.

Take the quality detector 152 as an example, which can be utilized within a predetermined time corresponding to M sample points for estimating triggered sample numbers of the control signals UPAB and DOWNAB to generate a first statistical value N1 and a second statistical value N2, respectively. When the first and second statistical values N1 and N2 are both larger than a predetermined threshold value L, the indication signal POORAB is triggered. FIG. 4 shows the detailed diagram of the quality detector 152 of the present embodiment.

An adder 412 and a delay register 422 form an accumulating loop. A decimator 432 outputs an accumulating result of every M sample points. The delay register 452 and the subtractor 462 are utilized for calculating number of triggered samples of the control signal in a predetermined time. The functionality of the quality detector 154 is the same as the quality detector 152. The quality detector 154 can estimate the number of triggered samples of the control signals UPCD and DOWNCD in the above-mentioned predetermined time corresponding to M sample points, to generate a statistical value N3 and a statistical value N4, respectively. When the statistical values N3 and N4 are both larger than the predetermined threshold value L, the indication signal POORCD is triggered. The detailed components can be the same as in FIG. 4, but should not be taken as a limitation.

The signal-synthesizing module 170 of FIG. 1 comprises a first multiplexer 172, a second multiplexer 174, and an adder 176. The multiplexer 172 outputs the candidate tracking error signal TECD when the indication signal POORAB is triggered, or outputs the candidate tracking error signal TEAB when the indication signal POORAB is not triggered. The multiplexer 174 outputs the candidate tracking error signal TEAB when the indication signal POORCD is triggered, or outputs the candidate tracking error signal TECD when the indication signal POORCD is not triggered. The adder 176 synthesizes the signals outputted from the multiplexers 172 and 174 to generate the tracking error signal TE. Obviously, when quality of the candidate tracking error signal TEAB is considered better, the signal-synthesizing module 170 utilizes twice the candidate tracking error signal TEAB to be the tracking error signal TE. When quality of the candidate tracking error signal TECD is considered better, the signal-synthesizing module 170 utilizes twice the candidate tracking error signal TECD to be the tracking error signal TE. When qualities of the candidate tracking error signals TEAB and TECD are determined neither superior nor inferior from each other, which means the indication signals POORAB and POORCD are both equal to logic '1' or logic '0', the signal-synthesizing module 170 synthesizes the candidate tracking error signals TEAB and TECD with equal weighting factors to generate the tracking error signal TE.

Figure 5:
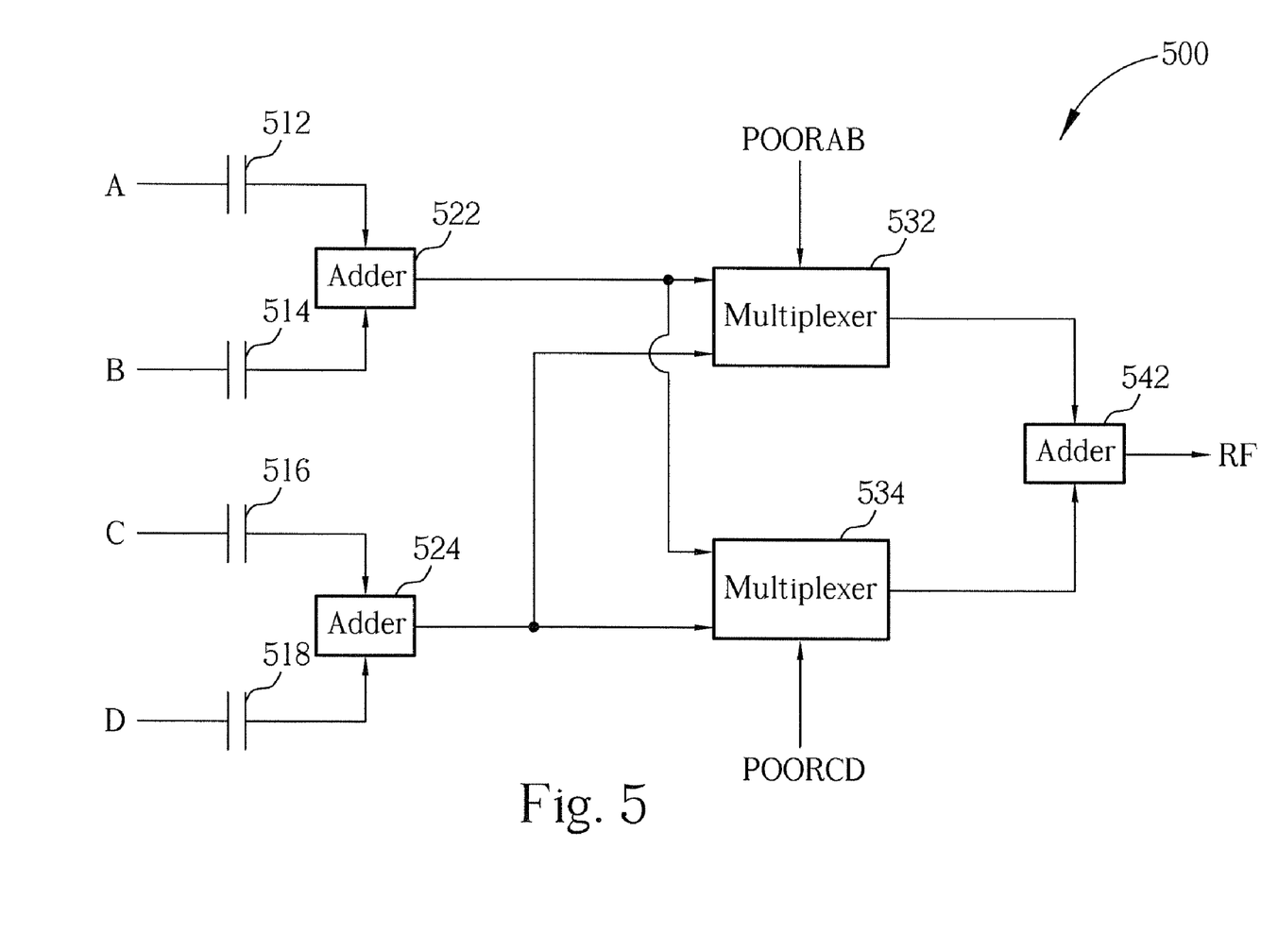
FIG. 5 is a diagram of an RF signal-synthesizing module according to an embodiment of the present invention.

In addition to generating the tracking error signal TE, the indication signals POORAB and POORCD generated from the quality detectors 152 and 154 shown in FIG. 1 can be applied to other occasions. For example, usually an optical disc drive synthesizes the four analog signals A, B, C, and D to generate an RF signal. Under the architecture of the above embodiment, however, when the values of the indication signal POORAB and POORCD are both equal to logic '0' or logic '1', the optical disc drive can generate the RF signal according to the four analog signals A, B, C, and D at the same time. When the values of the indication signals POORAB and POORCD are equal to '0' and '1', respectively, which means quality of the signals A and B is considered better than quality of the signals C and D, the optical disc drive can generate the RF signal exclusively according to the signals A and B. When the values of the indication signals POORAB and POORCD are equal to '1' and '0', respectively, which means quality of the signals C and D is considered better than quality of the signals A and B, the optical disc drive can generate the RF signal exclusively according to the signals C and D. Then the optical disc drive can dynamically determine how to generate the RF signal according to qualities of the signals A and B and signals C and D. In the present embodiment, a generation method of the above-mentioned RF signal can be shown in FIG. 5, which utilizes a similar architecture of the signal-synthesizing module 170 of FIG. 1 to utilize the multiplexers, which are controlled to select by the indication signals POORAB, POORCD, and adders to generate the RF signal, wherein the generating method of the signals POORAB, POORCD is the same as previously mentioned in FIG. 1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for generating a tracking error signal comprising:
   a signal generation module for generating a first and a second candidate tracking error signal according to a light beam reflected off an optical disc;
   a quality detection module coupled to the signal generation module for detecting quality of the first and/or the second candidate tracking error signal; and
   a signal-synthesizing module coupled to the signal generation module and the quality detection module, wherein the signal-synthesizing module is controlled by the quality detection module for selectively generating a tracking error signal according to the first and/or the second candidate tracking error signal;
   wherein if the quality detection module determines that quality of the first candidate tracking error signal is better than quality of the second candidate tracking error signal, the quality detection module controls the signal-synthesizing module to generate the tracking error signal exclusively according to the first candidate tracking error signal;
   if the quality detection module determines that quality of the second candidate tracking error signal is better than quality of the first candidate tracking error signal, the quality detection module controls the signal-synthesizing module to generate the tracking error signal exclusively according to the second candidate tracking error signal.

2. An apparatus for generating a tracking error signal comprising:
   a signal generation module for generating a first and a second candidate tracking error signal according to a light beam reflected off an optical disc;
   a quality detection module coupled to the signal generation module for detecting quality of the first and/or the second candidate tracking error signal; and
   a signal-synthesizing module coupled to the signal generation module and the quality detection module, wherein the signal-synthesizing module is controlled by the quality detection module for selectively generating a tracking error signal according to the first and/or the second candidate tracking error signal;
   wherein if the quality detection module determines that qualities of the first and second candidate tracking error signals are neither superior nor inferior from each other, the quality detection module controls the signal-synthesizing module to generate the tracking error signal according to both the first and second candidate tracking error signal.

3. An apparatus for generating a tracking error signal comprising:
   a signal generation module for generating a first and a second candidate tracking error signal according to a light beam reflected off an optical disc;
   a quality detection module coupled to the signal generation module for detecting quality of the first and/or the second candidate tracking error signal; and
   a signal-synthesizing module coupled to the signal generation module and the quality detection module, wherein the signal-synthesizing module is controlled by the quality detection module for selectively generating a tracking error signal according to the first and/or the second candidate tracking error signal;
   wherein the quality detection module triggers a first indication signal if the quality detection module detects inferior quality in the first candidate tracking error signal, or the quality detection module triggers a second indication signal if the quality detection module detects inferior quality in the second candidate tracking error signal; and the signal-synthesizing module comprises:
      a first multiplexer coupled to the signal generation module and the quality detection module for outputting the second candidate tracking error signal when the quality detection module triggers the first indication signal, and outputting the first candidate tracking error signal when the quality detection module does not trigger the first indication signal;
      a second multiplexer coupled to the signal generation module and the quality detection module for outputting the first candidate tracking error signal when the quality detection module triggers the second indication signal, and outputting the second candidate tracking error signal when the quality detection module does not trigger the second indication signal; and
      an adder coupled to the first and second multiplexers for synthesizing signals outputted from the first and second multiplexers to generate the tracking error signal.

4. An apparatus for generating a tracking error signal comprising:
   a signal generation module for generating a first and a second candidate tracking error signal according to a light beam reflected off an optical disc;
   a quality detection module coupled to the signal generation module for detecting quality of the first and/or the second candidate tracking error signal; and
   a signal-synthesizing module coupled to the signal generation module and the quality detection module, wherein the signal-synthesizing module is controlled by the quality detection module for selectively generating a tracking error signal according to the first and/or the second candidate tracking error signal;
   wherein the quality detection module triggers a first indication signal if the quality detection module detects inferior quality in the first candidate tracking error signal, or the quality detection module triggers a second indication signal if the quality detection module detects inferior quality in the second candidate tracking error signal; and the signal generation module comprises:

an optical sensing module for generating a first, a second, a third, and a fourth analog signal according to the light beam reflected off an optical disc; and a first phase detection module coupled to the optical sensing module for generating a first and a second control signal according to the first and second analog signal respectively;

a first charge pump coupled to the first phase detection module for generating the first candidate tracking error signal according to the first and second control signal;

a second phase detection module coupled to the optical sensing module for generating a third and a fourth control signal according to the third and fourth analog signal respectively; and a second charge pump coupled to the second phase detection module for generating the second candidate tracking error signal according to the third and fourth control signal;

wherein the quality detection module comprises a first quality detector coupled to the first phase detection module for calculating triggered sample numbers of the first and second control signal within a predetermined time to respectively generate a first and a second statistical value, and triggering the first indication signal when both the first and second statistical value are larger than a predetermined threshold value.

5. The apparatus of claim 4, wherein the first phase detection module comprises:

a first ADC unit coupled to the optical sensing module for converting the first and second analog signals into a first and a second digital signal respectively;

a first delay unit coupled to the first ADC unit for delaying the first and second digital signals to generate a first and a second delay signal respectively; and a first digital logic module coupled to the first ADC unit and the first delay unit for generating the first and second control signals according to the first and second digital signals and the first and second delay signals respectively.

6. The apparatus of claim 5, wherein the first and second digital signals, and the first and second delay signals are all 1-bit digital signals, wherein the first digital logic module triggers the first or second control signal when one out of the first and second digital signals, and the first and second delay signals differs from the other signals.

7. The apparatus of claim 6, wherein the first digital logic module triggers the first control signal when a value of the first digital signal differs from values of the first and second delay signals and a value of the second digital signal, or when a value of the second delay signal differs from the first and second digital signals and a value of the first delay signal.

8. The apparatus of claim 6, wherein the first digital logic module triggers the second control signal when a value of the second digital signal differs from values of the first and second delay signals and a value of the first digital signal, or when a value of the first delay signal differs from the first and second digital signals and a value of the second delay signal.

9. The apparatus of claim 6, wherein the first charge pump increases a level of the first candidate tracking error signal when the first digital logic module triggers the first control signal, or the first charge pump decreases the level of the first candidate tracking error signal when the first digital logic module triggers the second control signal.

* * * * *